Patented Nov. 28, 1922.

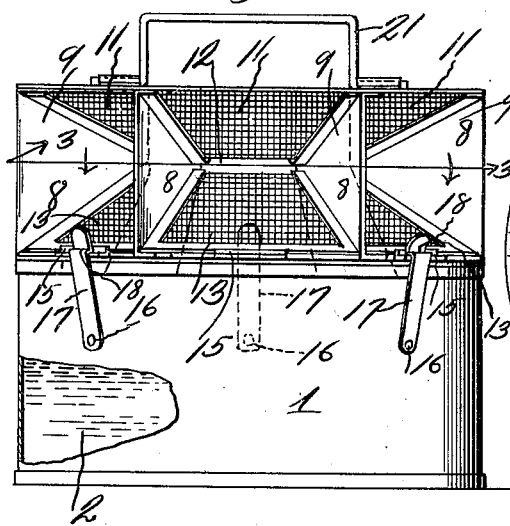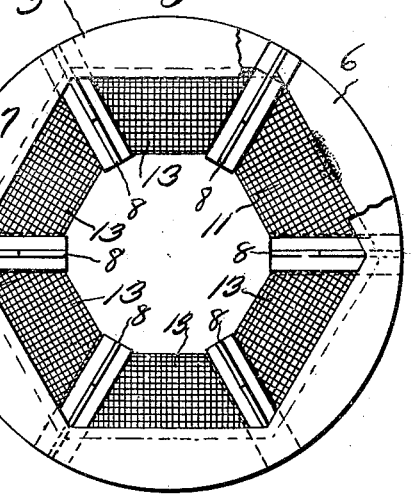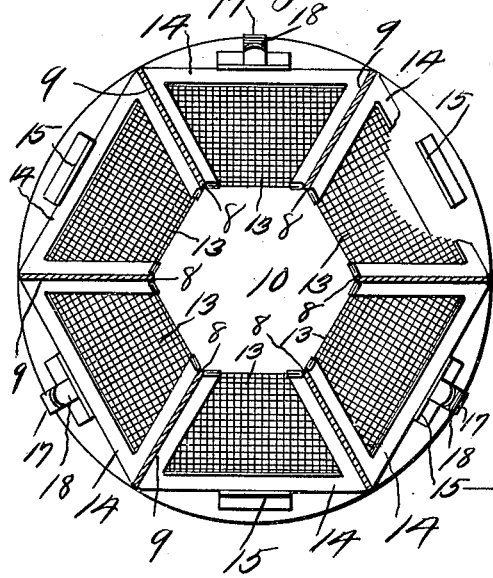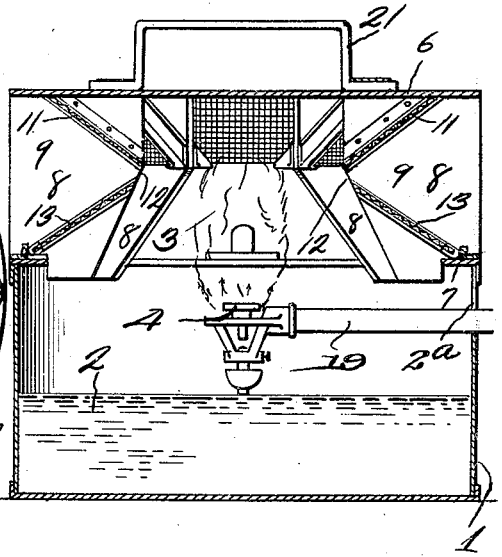

1,437,251

UNITED STATES PATENT OFFICE.

SILAS KESLING, OF PERU, INDIANA.

INSECT TRAP.

Application filed February 14, 1922. Serial No. 536,560.

*To all whom it may concern:*

Be it known that I, SILAS KESLING, a citizen of the United States, residing at Peru, in the county of Miami, State of Indiana, have invented a new and useful Insect Trap; and I do hereby declare the following to be a full, clear, and exact description of the invention, such as will enable others skilled in the art to which it appertains to make and use the same.

The invention relates to insect traps, and has for its object to provide a device of this character comprising a cylindrical receptacle for the reception of liquid and a burner in said receptacle centrally, a removable casing super-imposed on the receptacle and provided with regularly disposed insect entrance passages converging to narrow entrances adjacent the flames from the burner, and forming means whereby insects attracted by the light will be scorched by the flame from the burner and dropped into the liquid in the receptacle. The trap is particularly adapted for use in fields where growing crops are, and where various kinds of insects gather and damage the crops.

A further object is to provide an insect trap which may be easily and quickly converted into a trap of the liquid, flame or bait type, thereby allowing the trap to be used at night or the daytime, in a field or in a house.

A further object is to provide the radially disposed pockets with upper and lower walls formed from screening, thereby allowing the maximum amount of rays from the light to pass through the pockets for attracting insects.

A further object is to provide means whereby the receptacle may be easily and quickly removed for removing the dead insects therefrom, and the burner removed, thereby allowing the device to be used as a fly trap.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the trap.

Figure 2 is a bottom plan view of the super-imposed portion of the trap.

Figure 3 is a horizontal sectional view through the superimposed portion of the trap.

Figure 4 is a vertical sectional view through the trap.

Referring to the drawings, the numeral 1 designates a cylindrical receptacle in which fluid 2 is placed, and into which fluid the insects fall after being scorched or burned by the flame 3 of the burner 4. Disposed on the top of the wall of the receptacle 1 is a removable section 5, which section comprises spaced round plates 6 and 7, the plate 7 resting on the upper edge of the wall of the receptacle 1. The plates 6 and 7 are held in spaced parallel relation to each other by means of partitions 8, which are radially disposed thereby forming entrance passages 9 having inner restricted ends adjacent the flame chamber 10. Secured within the wedge shaped chambers 9 are downwardly and inwardly extending screens 11, which are fixed within the passages 9, and form a directing member for guiding the insects to the entrance passages 12, in connection with the removable screen members 13 disposed within the entrance passages 9, and extend upwardly and inwardly, and also guides insects to the entrances 12, which entrances are disposed adjacent the flame chamber 10 so that insects will enter the trap at points where they will be in contact with the flame from the burner 4 after being scorched or burned, will fall in the liquid 2 within the receptacle 1. The outer ends 14 of the screens 13 engage the members 15, which members in connection with the sides of the partition 8 maintain the screens 13 in inclined positions, thereby reducing the parts to a minimum and eliminating supporting flanges and the like, which accumulate dirt, and render the trap hard to clean.

Secured to the sides of the receptacle 1 at 16 are spring catches 17, the upper ends of which are provided with right angled portions 18, which overlie the plates 7 of the upper section 5 and hold the upper section 5 in superimposed position on the receptacle 1, and at the same time hold the section 5 in such a manner that it may be easily removed when it is desired to clean the trap, or to remove the burner 4 therefrom. The burner 4 is supplied with fuel by the supply pipe 19 which extends through a slot 2ᵃ in the wall of the receptacle 1. The upper section 5 is provided with a handle member 21 by means of which the device may be moved from place to place.

When it is desired to use the device for a fly trap, the burner 4 and pipe 19 are removed and a sweet material, such for instance as molasses is placed within the receptacle which will attract flies and cause them to enter the trap through the restricted entrances 12. When it is desired to destroy the flies within the trap, the same may be submerged in water or in a solution.

From the above it will be seen that an insect trap is provided which is simple in construction and has restricted entrance passages so constructed that they do not materially cut off the rays of light from the flames within the flame chamber.

It will be seen that by removing one of the loose lower screens, the lighting element may be placed in the center and the liquid in the container. When this is done the trap is in condition for use as a night trap. If so desired, when used as a night trap all of the lower screens are preferably removed.

By removing the light and placing all of the lower screens in each of the six openings and closing the slot 12 in any suitable manner, filling the receptacle with liquid and placing bait in the center of the trap, the device may be used as a day trap. Under these conditions the trap need not be submerged in water to kill the insects as they will fall in the liquid in the receptacle.

The invention having been set forth what is claimed as new and useful is:—

1. An insect trap comprising a cylindrical fluid receiving receptacle, a detachable section superimposed on the fluid receiving receptacle provided with a plurality of radially disposed inwardly tapered entrance passages, said passages being formed by radially disposed partitions and inwardly extending converging screens and a burner disposed within the fluid receptacle and positioned whereby a flame will extend upwardly between the inner ends of the entrance passages.

2. An insect trap comprising a fluid receiving receptacle, a removable trap section carried by said fluid receptacle, said trap section comprising horizontally disposed plates, inwardly tapered radially disposed entrance passages carried by said removable trap section, means for detachably securing the trap section to the fluid receiving receptacle, the side walls of the entrance passages being formed by vertically and radially disposed partitions connecting the plates together, the upper walls of said passages being formed by downwardly and inwardly extending screens, the lower walls of the entrance passages being formed by upwardly and inwardly extending screens, said last named screens being detachably carried and held in position by engagement with lugs carried by the lower plate and with the walls of the partitions.

In testimony whereof I have signed my name to this specification in the presence of two subscribing witnesses.

SILAS KESLING.

Witnesses:
 ALFRED RUNKEL,
 FRANK DUNN.